F. A. HOWARD.
DEVICE FOR MAKING LEAKY RIVETS TIGHT.
APPLICATION FILED MAR. 19, 1920.

1,371,485.

Patented Mar. 15, 1921.

Inventor:
Frank A. Howard
by S. W. Bates
Atty.

UNITED STATES PATENT OFFICE.

FRANK A. HOWARD, OF PORTLAND, MAINE.

DEVICE FOR MAKING LEAKY RIVETS TIGHT.

1,371,485.  Specification of Letters Patent.  Patented Mar. 15, 1921.

Application filed March 19, 1920. Serial No. 367,290.

*To all whom it may concern:*

Be it known that I, FRANK A. HOWARD, a citizen of the United States, residing at 34 Portland Pier, Portland, in the county of Cumberland and State of Maine, have invented certain new and useful Improvements in Devices for Making Leaky Rivets Tight, of which the following is a specification.

My invention relates to making tight leaky rivets, bolts, and the like when joining metal plates and is designed particularly for tightening leaky rivets in the bottoms of steel ships.

The object of the invention is to devise a quick acting device which may be readily applied to a leaky rivet and which will act to make the rivet perfectly tight.

The device is designed as a temporary expedient to be used in an emergency.

It consists essentially of a cup preferably made of cast iron adapted to fit over the head of the rivet with a gasket for making a tight joint with the plate and a brace or strut acting against some opposing portion of the ship or other structure by which the cup may be forced against the plate and the leak thus stopped.

Such a device as an emergency expedient is found to be useful many times where it is not expedient to dry-dock the vessel or replace the rivet.

Figure 1:
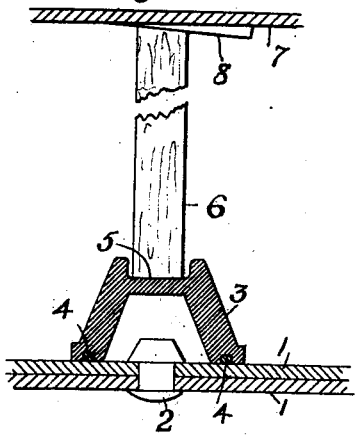
Figure 2:
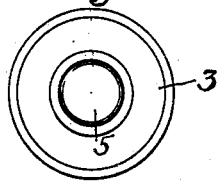

I have illustrated my invention in the accompanying drawing where Figure 1 shows a vertical section and Fig. 2 a plan of my device.

Referring to the drawing:

1—1 represents the iron or steel plates which may be at the bottom of the steel ship and 2 represents a rivet extending through the ship's bottom.

The leak stopping device consists of a cup 3 which is placed over the head of the rivet, the edges of the cup being provided with a gasket 4 to make a tight joint between the cup and the plate.

The cup 3 is held in place against the pressure of water by a brace or strut fitting within a recess 5 formed in the upper portion of the cup and bearing or acting against a permanent portion of the ship.

The top 7 of the ballast tank which is usual in steel ships is in good position to support a brace and this brace may be adjusted or tightened by means of a suitable wedge 8 inserted between the edge of the brace and the covering of the tank.

The brace may be supported against any opposing portion of the ship or other structure in which the device is used. The device is applicable for use not only for ship's hulls but for tanks or other structures where leaky rivets exist, it may be cheaply made and closely stored.

I claim:

1. A device for preventing leakage through the rivet joints in riveted plates consisting of a cup or shell fitting over the rivet head and making a tight joint with the plate with a brace or strut for forcing the cup against the plate.

2. A device for preventing leakage through rivet joints in riveted plates consisting of a cup or shell fitting over the rivet head and making a tight joint with the plate, said cup having a recess at its rear portion and a brace or strut bearing within said recess for forcing the cup against the plate.

In testimony whereof I have affixed my signature.

FRANK A. HOWARD.